Dec. 22, 1959   F. L. REED   2,917,965
FOLDING MUSIC DEVICE
Filed May 19, 1958
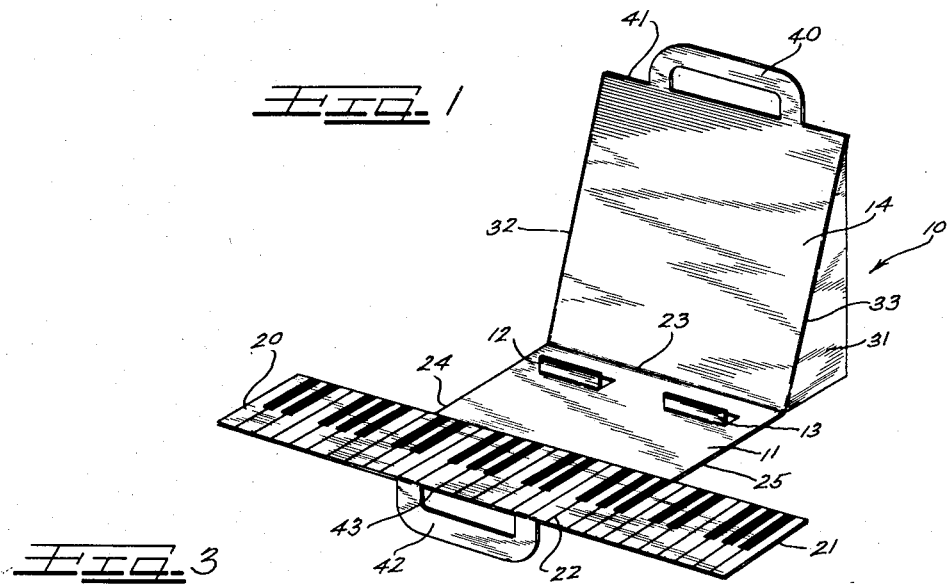
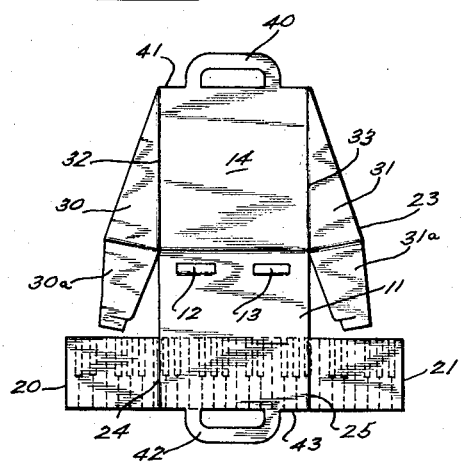
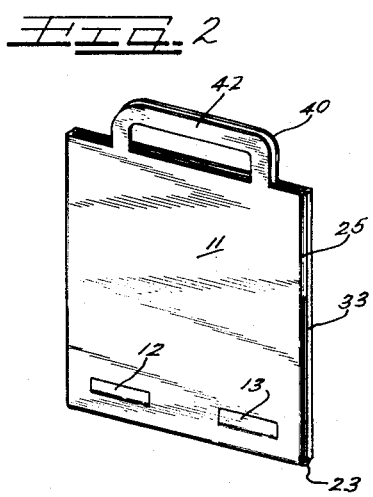
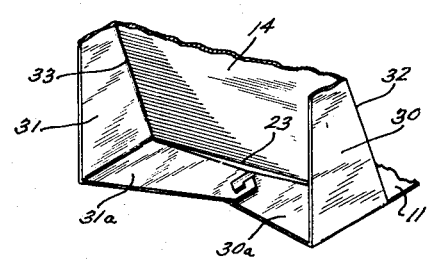
Inventor
FRANK L. REED
By Hill Sherman Meroni Gross & Simpson
Attys.

United States Patent Office 2,917,965
Patented Dec. 22, 1959

2,917,965

FOLDING MUSIC DEVICE

Frank L. Reed, Elkhart, Ind.

Application May 19, 1958, Serial No. 736,022

1 Claim. (Cl. 84—472)

This invention relates generally to a portable music device, and more specifically to an improved music rack and/or case having a training keyboard incorporated therein.

Although the principles of the present invention may be included in various devices, a particularly useful application is made in a combined rack, training device, and carrying case.

The present invention contemplates the device as comprising a unitary blank, such as of stiff paper, which is suitably cut and creased to provide the novel device shown and described herein. Where all of the novel features of this invention are utilized, the user of the device may use it to carry sheet music, either in a loose form or in a bound form therein. As such, the device may be used as and termed a carrying case. The device may be opened up and converted into a music rack for supporting and displaying the sheet music or other sheet material, and as such the device may be also termed a rack. One of the principal features of the instant invention is that the device is provided with indicia which represent a keyboard, for example of the pianoforte type, which keyboard is disposed remotely from the position at which the music is displayed and in front thereof, whereby the entire device may be used as a training aid for the teaching of music.

Accordingly, it is an object of the present invention to provide a music training device.

Another object of the present invention is to provide a combination keyboard-rack-case.

Yet another object of the present invention is to provide a combination rack and keyboard.

A still further object of the present invention is to provide a combination rack and case.

A still further object of the present invention is to provide a combination keyboard and music case.

Yet another object of the present invention is to provide a novel music rack.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

Figure 1 is a perspective view of a device provided in accordance with the principles of the present invention, as set up to provide a combined keyboard and music rack;

Figure 2 is a perspective view of the structure of Figure 1 folded to provide a carrying case;

Figure 3 is a plan view in reduced scale of a blank from which the structure of Figure 1 is made; and Figure 4 is a fragmentary perspective view of the reverse side of Figure 1.

As shown on the drawings:

The principles of this invention are particularly useful when embodied in a music rack having a keyboard, all of which may be collapsed to form a carrying case such as illustrated in Figure 1, generally indicated by the numeral 10. The rack 10 includes a base 11 having a pair of tab elements 12, 13, and a desk member 14.

The base member 11 has a pair of aligned extensions 20 and 21, and indicia are provided as at 22 on the base member 11 and on the extensions 20, 21 which indicia represent a keyboard.

The desk member 14 is hinged to the base 11 along a line 23. In this embodiment, the tab elements 12, 13 are integrally hinged to the base 11 along a line parallel to the hinged edge 23 and remote from the various edges of the base 11. The desk member 14, in cooperation with the tabs 12, 13 are adapted to jointly support and display sheet music. As such, the tabs 12, 13 are directed in the same general direction from the plane of the base 11 as is the desk member 14 when the device is set up as shown in Figure 1.

The base extensions 20, 21 are hinged to the base 11 along lines 24 and 25 which represent extensions of the opposite edges of the base 11 which edges are transverse to the hinge edge 23.

The desk 14 is provided with a pair of desk support members 30 and 31 which are hinged to the desk member 14 at their mutual edges 32, 33.

A handle 40 is secured to an edge 41 of the desk member 14, and a second handle 42 is secured to an edge 43 of the base member 11, both of the handles 40, 42 thus being secured to an edge remotely disposed from the hinged edge 23.

Referring now to Figure 3, there is shown a unitary blank, such as of stiff or heavy paper, from which the rack of Figure 1 is constructed. It will be noted that each of the support members 30 and 31 has a locking portion 30a, 31a respectively, each hinged to the main portion thereof at one end, and slotted at the other end to interlock with the other as shown in Figure 4.

To erect the rack from the condition shown in Figure 3 to the arrangement shown in Figure 1, the support members 30, 31 are bent backwardly along the lines 32, 33 respectively for about 90 degrees. The portions 30a and 31a are then bent toward the handles 40 for about 90 degrees and interlocked as shown in Figure 4. The base 11 may then be horizontally disposed and the desk hinged about the line 23 until the hinged edge within the support members 30 and 31 lies in the same plane as the base 11 as shown in Figure 1. The angle between the hinge within the support members and the lines 32, 33 respectively, determines the angle at which the desk 14 is disposed with respect to the base 11.

The elements 12 and 13 may then be hinged along an edge thereof, and if desired, the handle 42 may be hinged downwardly as shown in Figure 1 to move it out of the way.

When the rack is thus erected, it may be used to support the sheet music or other material resting against the desk 14 flatwise, its lower edge being prevented from sliding forward by the tabs 12 and 13. The keyboard is then utilized as an elementary musical training device.

The unitary blank of Fgure 3 may also be folded to provide the carrying case of Figure 2. Each of the base extensions 20, 21 are hinged along the lines 24, 25 respectively to overlie the base 11. The support members 30, 31 are hinged along the lines 32, 33 respectively to overlie the desk 14. The desk 14 and the base 11 are then hinged along the line 23 to the position shown in Figure 2. This last folding also turns the portions 30a, 31a in a manner to overlie the main part of the support members 30, 31 respectively.

If desired, the portions 30a, 31a may be hinged or folded before the support members are folded along the lines 32, 33 in which positions the portions 30, 31 would respectively overlay the portions 30a, 31a.

A sheet music or other sheet material may be laid on the base 11 before the extensions 20 and 21 are folded over. When this is done, the extensions 20, 21 encircle the sheet material so as to preclude such material's falling out from the case laterally. Sheet material may also be laid on the desk 14 before the support members 30, 31 are folded over it. In such event, the support members 30, 31 encircle the sheet material to preclude its falling out laterally from the case. Thus either or both of the base extensions or the desk support members may be selectably used to extend about the contents and the case.

It is to be understood that advantageous structures may be obtained even though certain of the foregoing features be omitted. For example, if the indicia representing the keyboard 22 be omitted, a combination rack and carrying case is effected. If the handles be omitted, a combination collapsible music rack and keyboard is effected. If the support members be omitted, a combination keyboard and carrying case is effected.

If the handles and keyboard be omitted, a collapsible rack is effected.

Although various minor modifications might be suggested by those versed in the art, it should be understood that I wish to embody within the scope of the patent warranted hereon all such embodiments as reasonably and properly come within the scope of my contribution to the art.

I claim:

A music rack comprising: a unitary blank of stiff paper, said blank including a base member having a tab element integrally hinged thereto remotely from its edges, and positionable generally transversely to said base; a desk member integrally hinged to said base member along an edge thereof and adapted with said element to jointly support and display sheet music; a pair of desk support members integrally hinged to opposite edges of said desk member transversely to said hinged edge for disposing said desk member generally parallel to said tab; said base member having a pair of aligned extensions integrally hinged to opposite edges thereof remotely from said hinged edge; said base member and said extensions having indica thereon representng a keyboard; a pair of locking portions, each of which is integrally hinged to one of said desk support members respectively along an edge transverse to said opposite edges, said locking portions being adapted to interlock with each other and to resist compression and tension forces; and a pair of carrying handles each of which is respectively integrally hinged to said desk and base members along another edge opposite to said first named hinged edge.

References Cited in the file of this patent

UNITED STATES PATENTS

| | | |
|---|---|---|
| 1,286,785 | Robbins | Dec. 3, 1918 |
| 1,841,310 | Apffel | Jan. 12, 1932 |
| 2,083,235 | Laukandt | June 8, 1937 |